March 24, 1970     H. J. SHOCKEY     3,502,531

METHOD FOR BEDDING PANELS INTO FRAMES

Filed March 28, 1966

INVENTOR.
HOWARD J. SHOCKEY
BY
Wilson, Settle, Batchelder
ATT'YS. & Craig

United States Patent Office 3,502,531
Patented Mar. 24, 1970

3,502,531
METHOD FOR BEDDING PANELS INTO FRAMES
Howard J. Shockey, Elkhart, Ind., assignor to Excel Corporation, Elkhart, Ind., a corporation of Indiana
Filed Mar. 28, 1966, Ser. No. 538,001
Int. Cl. C03c *27/04;* B32b *17/06*
U.S. Cl. 156—293   3 Claims

ABSTRACT OF THE DISCLOSURE

The method relates to the bedding of a panel into a frame which has interior surfaces defining a recess for receiving a marginal edge of the panel. In the method, a marginal edge portion of the panel is placed in the recess and sealing means are applied between the frame and the panel to form a liquid-tight cavity. A vacuum is then applied to this cavity and liquid bedding material is then drawn into the cavity as the result of the suction created to fill the cavity. The bedding material is then heated to cure to a solid form where it is adhered to the panel and frame.

CROSS-REFERENCE TO RELATED APPLICATION

This application is related to a co-pending application of Robert J. Deisenroth, Ser. No. 222,590, filed Sept. 10, 1962, now Patent No. 3,263,014, issued July 26, 1966, and assigned to the present assignee.

BACKGROUND OF THE INVENTION

One application for the method of the present invention is in the bedding of glass for automobile windows into frames. In the past, such glass panels have been bedded by folding a strip of rubber about an edge of the panel and inserting the panel edge into a recess of a channel-section frame member. Excess rubber has been trimmed off manually with a knife. Different glass thicknesses have required the use of rubber strips of different thicknesses. After bedding the panels it has been necessary to clean them because the bedding process with rubber strips is relatively messy. All of these steps have been performed manually, and consequently labor costs have been high.

In order to overcome the problems of the manual bedding method using rubber strips, it has been proposed to bed panels into frames by injecting a heat curable resinous bedding material in liquid form between the panel and the frame and curing the liquid bedding material to a solid form by heat. The solid bedding material adheres to the glass panel and the metal frame and provides a solid, resilient bed for the panel in the frame. One method of this type is described in said copending application of Robert J. Deisenroth, Ser. No. 222,590 filed Sept. 10, 1962 which has matured into the above-mentioned U.S. Patent No. 3,263,014 and is assigned to the assignee of this application. In the method of that patented application, sealing means is applied between the frame and the panel to form a liquid-tight cavity defined by the interior surface of the frame, the marginal edge of the panel which is received by the frame, and the sealing means. Liquid bedding material is injected into this cavity under a substantial pressure above atmospheric pressure. It is evident that the elevated pressure in the cavity tends to break the seal, so it is critical that a good seal be provided.

The critical nature of the seal is overcome by the method of the present invention wherein liquid bedding material is introduced into the same type cavity under a vacuum rather than under positive pressure. Like the method of the copending application, a marginal edge of a panel is placed in the recess of a frame and sealing means is applied between the frame and the panel so as to form a liquid-tight cavity. The sealing means is provided with two openings communicating with the cavity, and liquid bedding material is supplied to the cavity through one of the openings while a vacuum is applied to the other opening to pull the bedding material into and throughout the cavity. In this way, the bedding material may be introduced under a pressure equal to the difference between atmospheric pressure and the reduced pressure in the cavity. Atmospheric pressure on the seal tends to make the seal tighter because of the vacuum inside the cavity; atmospheric pressure actually forces the sealing members more strongly against the panel and the edge of the frame, thereby improving the seal. Thus, the sealing procedure is not as critical in the vacuum fill method of this application as in the pressure fill method of the above-mentioned patented application.

Accordingly, it is an object of this invention to provide a method of bedding a panel into a frame by vacuum filling a recess of the frame with liquid bedding material and heat curing the bedding material to a solid form.

Another object of the invention is to so seal a panel and frame assembly as to define a liquid-tight cavity in the frame, the sealing members being constructed and applied such that when air pressure in the cavity is reduced, the seal is made tighter.

A further object of the invention is to supply liquid bedding material to a sealed cavity in a frame through one opening leading through sealing means into the cavity and apply a vacuum to the cavity via another opening in the sealing means communicating with the cavity.

Other objects of this invention will appear in the following description and appended claims, reference being had to the accompanying drawings forming a part of this specification wherein like reference characters designate corresponding parts in the several views.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Figure 1:
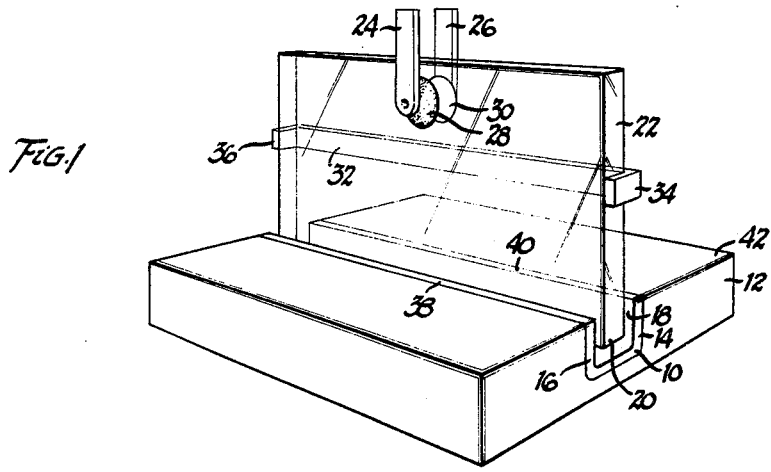
FIGURE 1 is a perspective view of a fixture and a frame and panel assembly showing a panel with one edge thereof extending into but spaced apart from a channel surface of the frame.

As shown on the drawings:

In FIGURE 1, a metal frame member 10 having a channel shape in cross section is placed in a recess of a fixture block 12 and is supported by the fixture block in an upright position. The legs 14 and 16 of frame member 10 extend upward and the interior channel surfaces 18 form a recess in which a panel can be inserted. The lower marginal edge 20 of a glass panel 22 extends downwardly into the recess of frame member 10 but the panel is spaced from the channel surface 18 both at its bottom edge and along the vertical sides of the panel. The panel is held in this position by clamping members 24 and 26 which have suction cups 28 and 30 applied to opposite faces of the panel 22. The panel 22 is centered and held against movement lengthwise of the frame 10 by a cross arm 32 which has inwardly bent end portions 34 and 36 embracing the vertical edges of the panel 22. Member 32 may be coated with rubber to avoid marring the glass. The top edges 38 and 40 of the frame member 10 are flush with the top surface 42 of the fixture block 12. Thus, the top edges 38 and 40 are available for application of sealing structure thereto.

Figure 2:
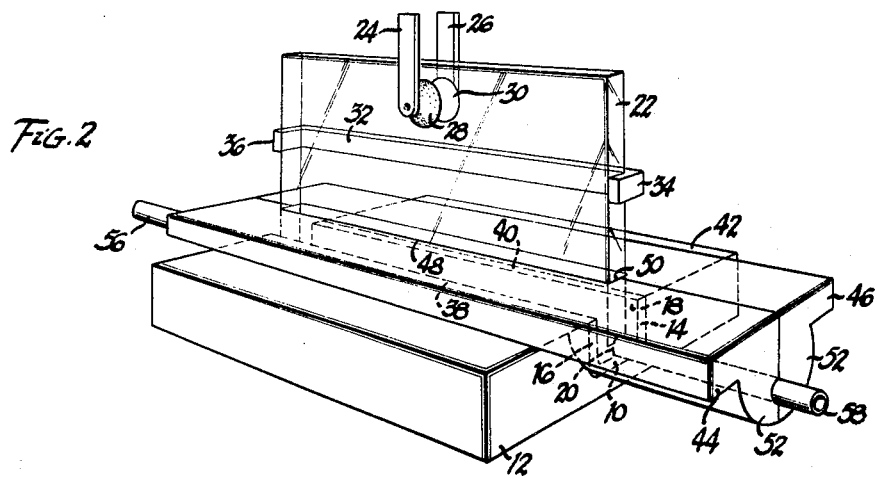
FIGURE 2 is a perspective view of the assembly of FIGURE 1 after sealing means has been applied between the panel and the frame.

The next step of the method is to apply sealing means between the frame and the panel, and the results of this step are shown in FIGURE 2. Two sealing members 44 and 46, preferably of silicone rubber, have been placed on the top surface 42 of block 12 and in contact with the top edges 38 and 40 of the channel member 10. The sealing members 44 and 46 are shaped so as to conform closely to the outer surface of panels 22. Each of these sealing members is recessed at its central portion, that is, at portions 48 and 50, so as to fit closely around the panel and provide a liquid-tight seal. The sealing members have downwardly projecting portions 52 at each end thereof which contact the end edges of the frame and close the open ends of the frame. The sealing members 44 and 46, together with the marginal edge 20 of panel 22 and the interior surfaces 18 of frame 10 define a liquid-tight cavity within the frame member 10. It is this cavity which is filled with liquid bedding material in the next step of the process.

The filling step is accomplished by supplying liquid bedding material through an opening in the sealing means communicating with one end of the cavity while applying vacuum to another opening communicating with the cavity at the other end of the sealing means. In FIGURE 2, the material supply opening is at the left end of the sealing members 44 and 46, and there is a tube 56 extending into this opening and providing an inlet for feeding liquid bedding material to the cavity within the frame 10. At the other end of the sealing means, there is a tube 58 to which vacuum is applied so as to reduce the pressure in the cavity within frame member 10. The openings in tubes 56 and 58 communicate with the cavity. A hose leading to a vacuum pump (not shown) may be coupled to the tube 58 when pulling a vacuum on the cavity. The openings and tubes 56 and 58 need not be in axially aligned relation as in FIGURE 2; they may extend out through the same side of the sealing means if desired.

It is evident that when vacuum is applied to the cavity, atmospheric pressure outside of the cavity forces sealing members 44, 45 and 46 into a tighter engagement with the surfaces 38 and 40 of frame member 10 and also with the surfaces at the ends of the frame member. The vacuum improves the seal provided by the sealing members. Liquid bedding material is fed under the pull of the vacuum conditions into the cavity within frame member 10 and is forced to flow up into the spaces between legs 14 and 16 of frame 10 and the side surfaces of the panel 22. Thus, all of the spaces in the cavity are filled with liquid bedding material.

After the vacuum filling step, the liquid bedding material in the frame 10 is heated so as to cure it to a solid condition in which it adheres strongly to the metal of the frame 10 and also to the glass of the panel 22. The heating step may be carried out by placing the frame and the panel assembly in an oven maintained at an elevated temperature (say 250–300° F.) for a short time (say about 45 seconds). Preferably, the sealing means is removed before the frame and panel assembly is placed in the oven in order to avoid solidifying bedding material which may be in the inlet and outlet openings through the sealing means. Alternatively, heating elements may be built into the fixture block 12, and these heating elements may be energized with electric current so as to heat up the fixture block and also heat the frame 10. Thus, heat is supplied to the liquid bedding material in the frame by conduction. It would also be possible to pass current through the metal frame member 10 to heat it directly and transfer heat to the liquid bedding material. High frequency induction heating could be used if desired.

Figure 3:
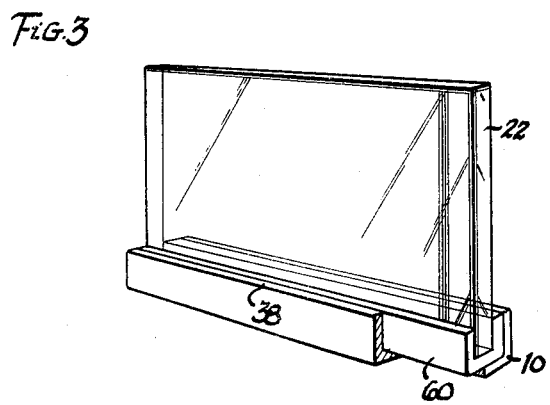
FIGURE 3 is a perspective view in partial section of the final assembly of frame and panel after the bedding material has been cured.

The final assembly following the curing step is shown in FIGURE 3. The bedding material 60 has solidified and bonded both to the metal of frame 10 and the glass of panel 22. The bedding material 60 provides a solid, resilient bed for the panel 22 in the frame 10.

The bedding material may be any suitable resinous material which has the following properties:

(1) Resiliency—to provide a suitable bedding for the glass.
(2) Adherence—to provide a bond between the glass and metal frame.
(3) Curability—to a solid state in a relatively short time by the application of heat, for example, within about 45 seconds at about 250° F.
(4) Resistance to weathering (sunlight, temperature changes and moisture absorption).
(5) Mechanical properties such as tensile strength, compressive strength, impact resistance and toughness sufficient to withstand the stresses normally encountered in use of the final assembly.

The bedding material may be either a thermoplastic or thermosetting plastic material. One class of resins suitable as bedding materials are the polyurethane resins. Polyurethane resins are obtained by the reaction of polyisocyanates with organic compounds containing two or more active hydrogens to form polymers having free isocyanate groups. Under the influence of heat, the free isocyanate groups react to form a thermosetting material. A suitable thermosetting form may be prepared from castor oil and a triisocyanate. A suitable thermoplastic material is polyvinyl resin.

Thus, the invention provides a method of bedding a panel into a frame by steps of sealing, vacuum filling and curing. The sealing step is made much less critical in the vacuum filling type of method because increased vacuum only tends to make the seal tighter rather than tending to break the seal as in the case for increased pressure in a pressure filling type of process. The vacuum filling step assures that liquid bedding material reaches all portions of the space between the panel and the frame. Different thickness of glass are allowed for automatically. The process is clean and no special cleanup procedures are required. There is no excess material, so no trimming is required. The process lends itself well to high production techniques.

I claim:

1. The method of bedding a panel into a frame having an interior surface defining a recess for receiving an edge portion of the panel, said method comprising the steps of placing a marginal edge portion of the panel in said recess of said frame in closely spaced relation with said interior surface, applying removable resilient sealing means between the frame and the panel to form a liquid-tight cavity defined by said interior surface, the marginal edge portion of said panel and said sealing means, providing at least two openings through said sealing means communicating with said cavity, reducing the pressures substantially below atmospheric pressure in said cavity by applying a vacuum through one of said openings and supplying liquid bedding material to said cavity via the other of said openings by the pull of said reduced pressure while simultaneously drawing the sealing members into tighter engagement with the frame and panel, and heating said bedding material in said cavity to cure the same to a solid form wherein said bedding material is adherent to said panel and said frame.

2. The method of claim 1 in which said openings are aligned axially with said frame, one said opening being located at one end of said frame and the other said opening being located at the other end of said frame.

3. The method of claim 1 in which both of said openings are located in said sealing means at the same side of said frame with one said opening adjacent one end of said frame and the other said opening adjacent the other end of said frame.

References Cited

UNITED STATES PATENTS

| | | | |
|---|---|---|---|
| 3,405,019 | 10/1968 | Sek et al. | 156—104 X |
| 3,430,333 | 3/1969 | Hodgen | 264—261 |
| 3,440,121 | 4/1969 | Shockey | 264—261 X |
| 3,415,701 | 12/1968 | Haldane et al. | 161—190 X |
| 2,923,029 | 2/1960 | Harris et al. | 18—1 |
| 3,098,698 | 7/1963 | Glynn | 264—261 |
| 3,183,143 | 5/1965 | Harris | 264—90 X |
| 3,263,014 | 7/1966 | Deisenroth | 264—261 |
| 3,272,900 | 9/1966 | Ryan et al. | 264—261 X |
| 2,495,640 | 1/1950 | Muskat | 264—257 |
| 2,903,389 | 9/1959 | Fujita | 264—102 |

HAROLD ANSHER, Primary Examiner

U.S. Cl. X.R.

156—104, 245, 285, 382; 264—90, 101, 261, 279, 325